United States Patent [19]
Thoolen

[11] Patent Number: 5,634,381
[45] Date of Patent: Jun. 3, 1997

[54] ARRANGEMENT COMPRISING A COUPLING FLANGE

[75] Inventor: Franciscus J. M. Thoolen, Horn, Netherlands

[73] Assignee: CCM Beheer B.V., Nuenen, Netherlands

[21] Appl. No.: 397,139

[22] PCT Filed: Sep. 3, 1993

[86] PCT No.: PCT/NL93/00179

§ 371 Date: Mar. 10, 1995

§ 102(e) Date: Mar. 10, 1995

[87] PCT Pub. No.: WO94/07052

PCT Pub. Date: Mar. 31, 1994

[30] Foreign Application Priority Data

Sep. 11, 1992 [NL] Netherlands ............... 9201585

[51] Int. Cl.[6] .................................................. F16F 15/315
[52] U.S. Cl. ..................................... 74/572; 74/574
[58] Field of Search ........................ 74/572, 573 R, 74/574, 595, 597

[56] References Cited

U.S. PATENT DOCUMENTS

| | | | |
|---|---|---|---|
| 2,878,689 | 3/1959 | Aebersold | 74/574 |
| 4,479,568 | 10/1984 | Palazzolo et al. | 74/572 |
| 4,499,772 | 2/1985 | Haas | 73/666 |
| 4,860,611 | 8/1989 | Flanagan et al. | 74/574 |
| 5,012,694 | 5/1991 | McGrath | 74/572 |

FOREIGN PATENT DOCUMENTS

| | | | |
|---|---|---|---|
| 1-182650 | 7/1989 | Japan | 74/574 |
| 313851 | 8/1930 | United Kingdom | 74/574 |
| 2061449 | 5/1981 | United Kingdom . | |

Primary Examiner—Rodney H. Bonck
Assistant Examiner—Mary Ann Battista
Attorney, Agent, or Firm—Edmund M. Jaskiewicz

[57] ABSTRACT

A flange (6) for coupling a cylindrical element (4) to be driven at a high rotational speed with an inner, and coaxial, rotating axle (2), comprising a first cylindrical inner part (26) connected with the axle, and connected via a connecting part (12), to a cylindrical radially outer part (20, 10) which bears the cylindrical part (4), with which it is intended to accomplish to retain a good contact, also at high rotational speeds, between this outer surface (10) and the rotor (4) carried on it. For this purpose the connecting part (6) in the invention is formed by two disc-shaped parts (14, 16) situated at a distance from one another in an axial and radial direction, the outermost (14) of which is connected to the outer part (20) via an essentially right-angled transition, the innermost (16) of which is connected to the inner part (26) via an essentially right-angled transition, and which are connected to one another via an intermediary part (24) via an essentially right-angled transition.

3 Claims, 1 Drawing Sheet

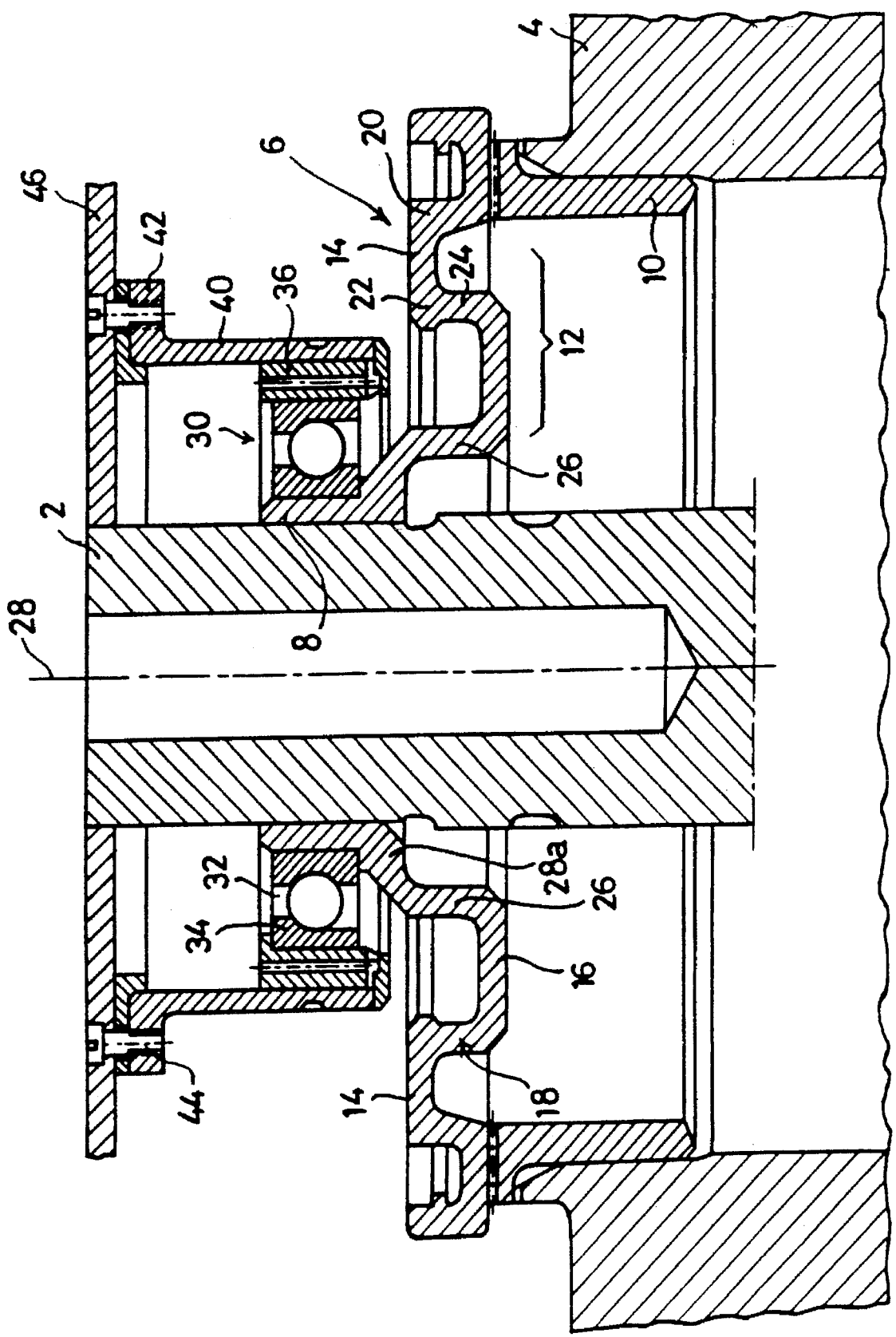

ARRANGEMENT COMPRISING A COUPLING FLANGE

FIELD OF THE INVENTION

The invention relates to an arrangement comprising a flange for coupling a cylindrical element to be driven at a high rotational speed with an inner, and coaxial rotating axle, comprising a first, cylindrical inner element suitable for being connected to the axle and connected via a connecting part to a cylindrical outer part to which the cylindrical element is attached, said element being situated radially outside of said outer part, said connecting part comprising two disk-shaped parts, lying at a distance of each other in the axial direction and being interconnected by an intermediary part via respective essentially right-angled transitions.

DESCRIPTION OF THE PRIOR ART

Such an arrangement is known from U.S. Pat. No. 5,012,694. This known arrangement is intended to be used in an energy storing flywheel and more particularly for interconnecting the ring-shaped parts of such a flywheel which is made up of a number of concentric, distinct, ringlike components.

During operation these ringlike components exhibit a radial growth. The known arrangement is intended to take-up such a radial growth as a result of the fact that the disk-shaped parts, which are lying at a radial distance of each other can move with respect to each other in the radial direction so that during operation the engagement of surfaces thereof with the inner surface of the outer component is maintained. The engagement with the inner component is maintained by a special inner ringlike retaining component. This specific known structure is only suitable to be used with low-mass flywheels.

SUMMARY OF THE INVENTION

The invention aims to provide an arrangement of the above mentioned kind which can be used with a flywheel having a relatively large mass, which is able to yield elastically in a radial direction while the radial rigidity which is required to counteract any radially concentrated loads and which is also necessary for a good vibration behaviour is neverthless maintained.

To this purpose the disk-shaped parts are also situated at a distance from one another in the radial direction, the outermost thereof is connected to the outer part via an essentially right-angled transition, and the innermost thereof is connected to the inner part via an essentially right-angled connection the outermost of said disk-shaped parts is only connected to the outer part of said cylindrical inner and outer parts and the innermost of said disk-shaped parts is only connected to the inner part of said cylindrical inner and outer parts.

With the measures in accordance with the invention a completely uniform contact pressure along the entire circumferences is obtained, while a much greater torque can be transferred. The entire unit is very easy to manufacture.

A preferred embodiment is characterized in that the intermediary part that is essentially cylindrical and coaxial to the rotating axle.

The claimed exclusive right also involves a device with a flange characterized by at least one rotor bearing, the rotating inner ring of which closely encloses the external surface of the inner part of the flange, while the stationary outer ring is supported by the surrounding.

BRIEF DESCRIPTION OF THE DRAWING

The invention is disclosed in detail in conjunction with the drawing which shows a cross-section of the preferred embodiment of the invention.

DESCRIPTION OF THE PREFERRED EMBODIMENT

In the figure the reference numeral 2 indicates the stationary axle of a rotating unit, in particular an energy storage unit, the rotor of which 4 is also partially and schematically illustrated.

The coupling between the axle 2 and the rotor 4 is achieved in a very special manner by an essentially S-shaped flange 6; a similar flange is also fitted to both the upper and lower end of the axle. The FIGURE illustrates the flange fitted to the upper end of the axle.

This flange 6 consists of a cylindrical inner part 8 that encloses the axle 2 and is connected to the rotating part 30 of the bearing 32 and a cylindrical outer part 10 to which the rotor 4 is attached. Inner part 8 and outer part 10 are connected to one another by a connecting part in its entirety indicated by reference numeral 12, which consists of a first, outer, disc-shaped part 14 and a second, inner, also disc-shaped part 16, and which parts are situated at a distance from one another in both an axial and radial direction. They are connected to one another via an intermediary part 18.

The outer part 10 merges via a first, essentially right-angled transition 20, into the disc-shaped outer part 14, which then merges via a second, also essentially right-angled transition 22, into the cylindrical intermediary part 18; this intermediary part 18 then merges via a third, also essentially right-angled transition 24, into the disc-shaped inner part 16 which continues via a right-angled transition 26 and a transition part 28a, which encloses an angle with the centre line 28 of the axle 2 into the cylindrical inner part 8.

In the illustrated preferred embodiment the cylindrical inner part 8 bears the inner ring 30 of the ball bearing 32 rotating with it, the outer ring 34 of which is connected via suitably implemented coupling pieces 36 to the bush 40, the flange 42 of which is attached via bolts 44 to a fixed housingpart 46, to which the axle 2 is also attached.

I claim:

1. A coupling flange device for connecting a high rotational speed cylindrical element (4) to a coaxial rotating axle (2) comprising a first cylindrical inner part (8) for connection to the axle (2), a connecting part (12) interconnecting said first cylindrical inner part (8) to a cylindrical outer part (10), the cylindrical element (4) being disposed radially outwardly of said cylindrical outer part (10) and being attached thereto, said connecting part (12) comprising first and second disc-shaped parts (14,16) which are axially and radially spaced from each other such that said first part (14) is radially outwardly of said second part (16), an intermediate part (18) connecting said first and second disc-shaped parts and comprising a pair of first and second right-angle transition members (22,24), a third right angle transition member (20) connecting said first disc-shaped part (14) to said cylindrical outer part (10), a fourth right angle transition member (26) connecting said second disc-shaped part (16) to said first cylindrical inner part (8), said first disc-shaped part (14) being connected only to the cylindrical outer part (10) of said inner and outer cylindrical parts (8,10) and said second disc-shaped part (16) connected only to the first cylindrical inner part (8) of said inner and outer cylindrical parts (8,10), said first, second, third, and fourth right angle transition members and said first and second disc-shaped parts defining an S-shaped member connected only to said inner (8) and outer (10) cylindrical parts.

2. A coupling flange device according to claim 1 wherein the intermediate part (18) is cylindrical and coaxial to the rotating axle.

3. A coupling flange device according to claim 1 and further comprising at least one rotor bearing (32) having a rotating inner ring (30) closely enclosing an external surface of the first cylindrical inner part (8), and further having a stationary outer ring (34) supported by a surrounding housing part (46).

* * * * *